J. DEMMER.
CORN PLANTER HARROW ATTACHMENT.
APPLICATION FILED MAY 15, 1915.
1,171,178.
Patented Feb. 8, 1916.
2 SHEETS—SHEET 2.
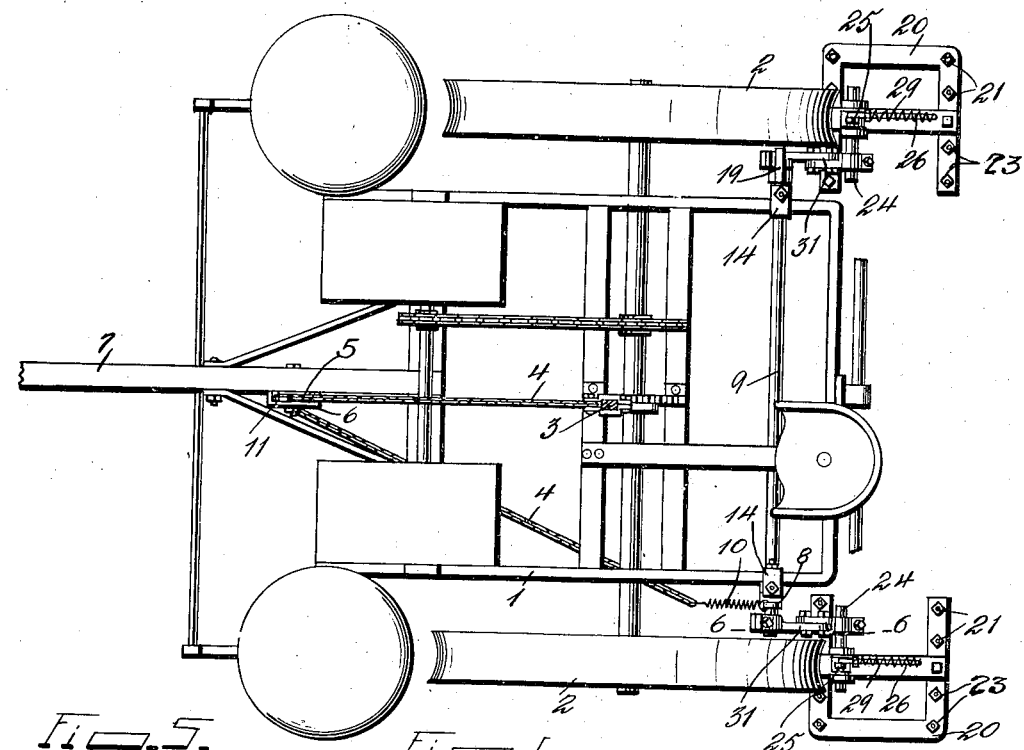
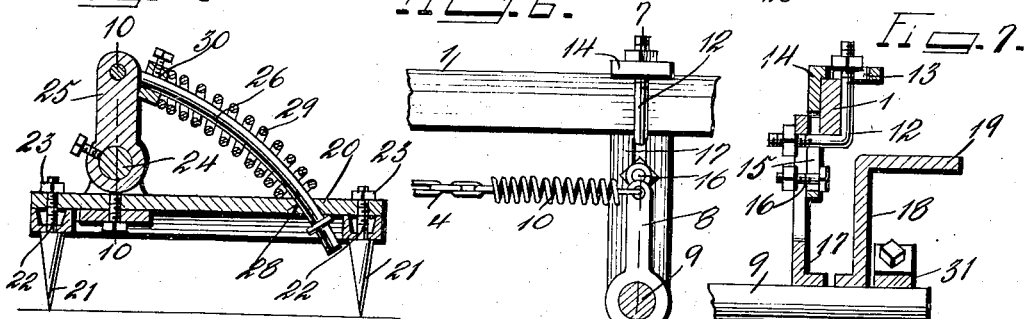
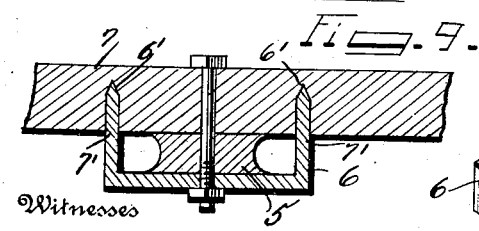
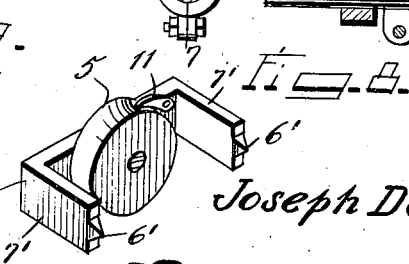
Inventor
Joseph Demmer
By E. E. Vrooman & Co.,
his Attorneys
Witnesses

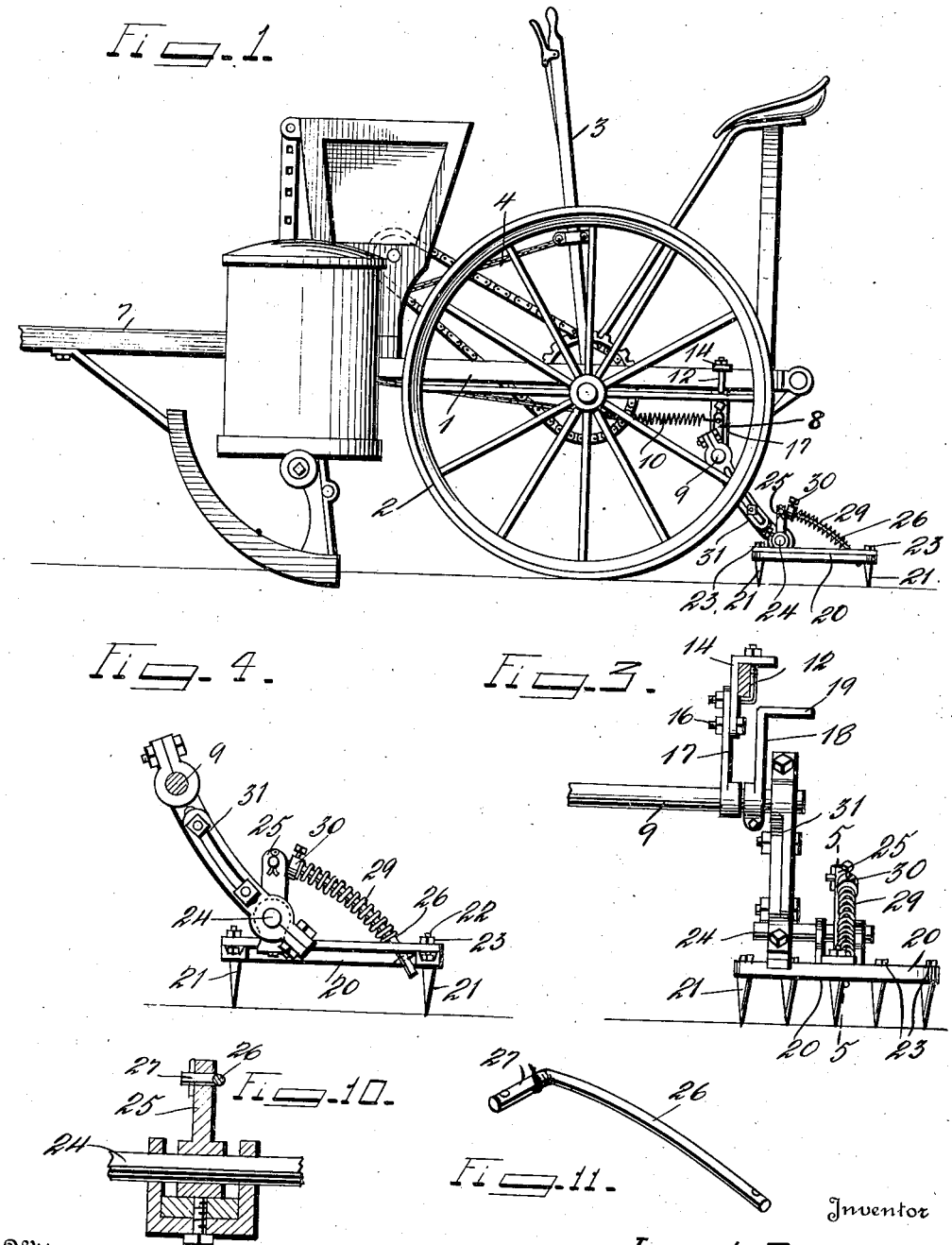

UNITED STATES PATENT OFFICE.

JOSEPH DEMMER, OF DYERSVILLE, IOWA.

CORN-PLANTER HARROW ATTACHMENT.

1,171,178.  Specification of Letters Patent.  Patented Feb. 8, 1916.

Application filed May 15, 1915.  Serial No. 28,368.

*To all whom it may concern:*

Be it known that I, JOSEPH DEMMER, a citizen of the United States of America, residing at Dyersville, in the county of Dubuque and State of Iowa, have invented certain new and useful Improvements in Corn-Planter Harrow Attachments, of which the following is a specification, reference being had therein to the accompanying drawing.

This invention relates to corn planter harrow attachments, and has for its object the production of a simple and efficient harrow mechanism whereby the harrow may be so mounted as to be yieldably supported to permit the harrow to accommodate itself to the unevenness of the ground over which the device may be passing.

Another object of this invention is the production of a simple and efficient means for raising the harrow devices to the proper position or out of engagement with the ground while the corn planter is being conveyed from place to place when it is not desired to use the harrow attachment.

With these and other objects in view this invention consists of certain novel combinations, constructions, and arrangements of parts as will be hereinafter fully described and claimed.

In the accompanying drawings:—Figure 1 is a side elevation of the corn planter showing the harrow attachment applied thereto. Fig. 2 is a top plan view of the corn planter showing the harrow attachment applied thereto. Fig. 3 is a front elevation of one end of the harrow attachment used in connection with the present invention. Fig. 4 is a cross section through the harrow supporting rod showing the harrow in side elevation. Fig. 5 is an enlarged section of the harrow taken on line 5—5, of Fig. 3. Fig. 6 is an enlarged section taken on line 6—6, of Fig. 2. Fig. 7 is a section taken on line 7—7, of Fig. 6. Fig. 8 is a perspective view of the guiding pulley over which the elevating chain passes. Fig. 9 is a longitudinal section through the draft beam of the corn planter showing the manner in which the chain guiding pulley is supported thereon. Fig. 10 is a section taken on line 10—10 of Fig. 5. Fig. 11 is a detail perspective of one of the spring guiding rods adapted to support the spring for normally holding the harrow frame in engagement with the ground.

By referring to the drawings it will be seen that 1 designates the frame of the corn planter which is supported upon the usual wheels 2. The corn planter 1 carries a harrow raising lever 3, which lever engages a chain 4, the chain 4 passing over and around a pulley 5 carried by a frame 6 supported upon the tongue or draft beam 7 of the harrow frame 1. This chain 4 is in turn connected with the upwardly extending arm 8 of the harrow supporting bar 9, and this arm 8 is connected to the chain 4 by means of a spring 10 constituting a yieldable connection therefor. A dog 11 is mounted upon the frame 6 and is adapted to engage the links of the chain 4, providing the operator is desirous of locking the chain 4 against movement around the pulley 5, and in this manner prevent the harrow supporting bar 9 from rotating accidentally.

The harrow supporting bar 9 is suspended from the frame 1 of the harrow by means of the L-shaped bolts 12, which bolts pass through the elongated apertures 13 formed in the bracket 14, the bracket 14 fitting over the frame 1. The bracket 14 is provided with a depending arm having a longitudinally extending slot 15 formed therein, through which slot 15 projects the bolt 12 and also the bolt 16 for supporting the depending arms 17 upon the bracket 14.

A foot lever 18 is secured to the shaft or bar 9 and is provided with a laterally extending foot engaging portion 19 to permit the operator to rotate the bar 9 when so desired by means of the foot for the purpose of raising the harrows 20 to be hereinafter more fully described.

The harrows 20 are preferably U-shaped frames carrying a plurality of depending teeth 21, which teeth may be secured thereto in any suitable manner, preferably by having their threaded standards 22 passing through the frame 20 and carrying nuts 23 for firmly holding the teeth 21 in firm engagement with the frame 20. A stub shaft 24 is supported upon the frame 20 and this stub shaft 24 carries an upwardly extending arm 25, to which arm 25 is connected a curved bar 26 having its laterally extending end 27 fixedly secured to the arm 25. The lower end of the bar 26 passes through an aperture 28 formed in the frame 20, and a coil spring 29 is mounted upon the bar 26 normally holding the rear end of the harrow frame 20 in proper position to permit all of the teeth of the harrow to firmly press upon the upper surface of the ground over which the corn planter is passing. A collar 30 is adjustably mounted upon each bar 26 to permit the tension of the spring 29 to be regulated. It should be understood that one of these harrow frames 20 is carried in the rear of each seed box or wheel of the corn planter so as to efficiently cover or harrow the ground after the seed has been planted.

By referring to Figs. 8 and 9 it will be seen that the frame 6 is provided with a plurality of spurs 6' upon its parallel arms 7' for the purpose of facilitating the connection of the frame 6 in firm engagement with the tongue or draft beam 7. It should be further understood that a very simple and efficient means has been produced for yieldably supporting the harrows in engagement with the ground over which the device is passing, and at the same time permit the harrows to give under extraordinary pressure in the event the harrow frame should come in contact with a stone or other obstruction.

It should be understood that the stub shafts 24 of the frame 20 are supported by means of a plurality of depending adjustable bars 31 which are in turn connected to the bar 9 to permit the harrow frames to be bodily lifted out of engagement with the ground when so desired by means of the rotation of the bar 9 either through the actuation of the lever 3, chain 4 and arm 8, or through the foot operated lever 18.

Having thus described the invention what is claimed as new, is:—

1. In a device of the class described, the combination with a planting frame, of a harrow supporting bar carried by said frame, yieldable means connected to said bar and facilitating the rotation thereof, suspending brackets connected to said bar, harrow frames connected to said suspending brackets, stub shafts carried by said harrow frames and engaging said suspending brackets, an upwardly extending arm connected to one of said stub shafts, yieldable means engaging said upwardly extending arm and engaging said harrow for yieldably holding said harrow in engagement with the ground over which the same is passing.

2. In a device of the class described, the combination with a frame, a plurality of harrows suspended therefrom and adapted to normally lie in engagement with the ground over which said frame is passing, each harrow frame provided with a substantially U-shaped body, harrow teeth carried by each body, a stub shaft carried by each harrow frame, an upwardly extending arm carried by each stub shaft, a bar connected to said upwardly extending arm and to said harrow frame, a spring carried upon said arm, means for regulating the tension of said spring, and said spring adapted to yieldably hold said harrow frame in firm engagement with the ground over which said harrow frame is passing.

In testimony whereof I hereunto affix my signature in presence of two witnesses.

JOSEPH DEMMER.

Witnesses:
 JOHN A. SCHNIEDERS,
 HENRY L. DEMMER.